United States Patent
Kim

(10) Patent No.: US 9,139,187 B2
(45) Date of Patent: Sep. 22, 2015

(54) CONTROLLING METHOD OF POWER DELIVERY SYSTEM OF VEHICLE

(75) Inventor: Beomsoo Kim, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 838 days.

(21) Appl. No.: 13/313,928

(22) Filed: Dec. 7, 2011

(65) Prior Publication Data

US 2012/0149530 A1    Jun. 14, 2012

(30) Foreign Application Priority Data

Dec. 8, 2010    (KR) ......................... 10-2010-0125097

(51) Int. Cl.
*B60W 10/02* (2006.01)
*F16H 61/14* (2006.01)
*F16H 59/14* (2006.01)
*F16H 59/46* (2006.01)

(52) U.S. Cl.
CPC ......... *B60W 10/023* (2013.01); *F16H 61/143* (2013.01); *B60W 2510/0657* (2013.01); *F16H 2059/147* (2013.01); *F16H 2059/467* (2013.01); *F16H 2061/145* (2013.01); *Y10T 477/755* (2015.01)

(58) Field of Classification Search
None
See application file for complete search history.

(56) References Cited

U.S. PATENT DOCUMENTS 6,817,965 B2 * 11/2004 Tabata ........................ 477/33

FOREIGN PATENT DOCUMENTS

JP    2005-214283 A    8/2005
JP    2010-121653 A    6/2010

OTHER PUBLICATIONS

G. Lee et al., "Effect of Slip-Controlled Torque Converter Damper Clutch in 5-Speed Automatic Transmission on Slip Rate and Fuel Economy," *Transactions of KSAE*, vol. 17, No. 3, pp. 74-80 (2009). Abstract.

* cited by examiner

*Primary Examiner* — Erin D Bishop
(74) *Attorney, Agent, or Firm* — Morgan, Lewis & Bockius LLP

(57) ABSTRACT

A control method of a power delivery system of a vehicle, may include determining a theoretical target slip velocity of a torque converter for slipping a damper clutch, detecting a real slip velocity of the damper clutch in a real driving condition based on the theoretical target slip velocity, expressing distributions of the real slip velocity according to an engine load ratio into a control line diagram, and controlling the real target slip velocity of the damper clutch according to the control line diagram by using the engine load ratio.

6 Claims, 10 Drawing Sheets

FIG. 7

① $\text{Load\_ratio} = \dfrac{(N_e - N_e\,\text{idle})}{(T_q - T_q\,\text{idle})} \times \text{Load gain(Variable coefficient)}$ ② $\text{SLip} = N_e(\text{Enginerpm}) - N_t(\text{Transmission input shaft speed})$ ③ MPI Engine = TPS Signal input
Diesel/Turbo engine=Engine torque input

CONTROLLING METHOD OF POWER DELIVERY SYSTEM OF VEHICLE

CROSS-REFERENCE TO RELATED APPLICATION

The present application claims priority to Korean Patent Application No. 10-2010-0125097 filed in the Korean Intellectual Property Office on Dec. 8, 2010, the entire contents of which is incorporated herein for all purposes by this reference.

BACKGROUND OF THE INVENTION

1. Field of the Invention

The present invention relates to a control method of a power delivery system of a vehicle having a torque converter and a damper clutch that smoothly and efficiently transfers a transmission with an engine torque.

2. Description of Related Art

According to a prior art, an automatic transmission automatically shifts gear according to a driving condition.

The automatic transmission uses a torque converter to transfer engine torque to a transmission, wherein the torque is transferred through operating fluid of the torque converter and the slip is generated during the torque transmission thereby.

A damper clutch is disposed in the torque converter to reduce the slip and the damper clutch is operated in a predetermined running state to direct connect the engine with the transmission such that the fuel consumption efficiency and power delivery rate are improved.

While the damper clutch is operated, the engine is not directly to the turbine of the transmission but the slip connection method is used so as to prevent booming noise that is generated by direct connecting the engine with the transmission.

When the damper clutch is slip controlled, the slip velocity is set by considering durability limit of the damper clutch and the slip velocity according to the input torque. Here, the slip velocity is set by a map according to the output shaft speed (NAB) of the transmission and a throttle opening amount (HDK), wherein the slip velocity is set to 50 rpm.

Meanwhile, an equal target slip velocity (50 rpm) is applied by using a durability limit of the damper clutch within a limited slip area, wherein power performance such as acceleration of a vehicle or fuel consumption efficiency is not considered.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a control method of a power delivery system of a vehicle having advantages of smoothly and efficiently transferring power of an engine to a transmission and reducing fuel consumption by considering power performance such as acceleration of a vehicle and fuel consumption characteristic while a damper clutch is slip controlled.

In an aspect of the present invention, a control method of a power delivery system of a vehicle, may include determining a theoretical target slip velocity of a torque converter for slipping a damper clutch, detecting a real slip velocity of the damper clutch in a real driving condition based on the theoretical target slip velocity, expressing distributions of the real slip velocity according to an engine load ratio into a control line diagram, and controlling the real target slip velocity of the damper clutch according to the control line diagram by using the engine load ratio.

A range of the real slip velocity is limited within a predetermined range, and a range of the engine load ratio is limited within a predetermined range.

The control method of the power delivery system may further include selecting a slip area for slipping the damper clutch between a line that an unit fuel consumption amount is lowest and a line that an acceleration value is 0, wherein the slip area is set according to an output shaft speed of a transmission and an accelerator pedal sensor, setting up the slip area, a lock up release area, and a lock up area according to an opening rate of a throttle valve (TPS) and the output shaft speed of the transmission, selecting boundary of the slip area and matrix points thereof, determining output torque of an engine in the boundary and boundary points and setting up durability limit slip velocity in the boundary and the boundary points by using a durability limit of the damper clutch, and setting up a permission slip velocity in the boundary and the boundary points in a slip control entry area through a speed ratio between an input shaft speed of the transmission and the output shaft speed of the engine, wherein a minimum value among the durability limit slip velocity and the permission slip velocity is set to the theoretical target slip velocity.

The real slip velocity ranges from 20 to 100 rpm.

The engine load ratio ranges from 0.5 to 2.

The engine load ratio is determined by $(Ne-Ne\_idle)/(Tq-Tq\_idle)*$load gain value, wherein Ne is an engine rotation speed, Ne_idle is an idle speed of engine, Tq is an engine output torque, Tq_idle is an engine output torque in an idle condition, the load gain value is a variable coefficient that is set according to a gear step of a transmission.

A slip velocity of the damper clutch is determined by Ne−Nt, wherein Ne is an engine rotation speed, and Nt is a transmission input shaft speed.

As stated above, a control method of a power delivery system according to an exemplary embodiment of the present invention considers power performance such as acceleration of a vehicle and fuel consumption characteristic to reduce fuel consumption and transfer engine power to a transmission smoothly and efficiently, while the damper clutch is slip controlled.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 7 shows formula showing contents for load ratio and slip velocity in a power delivery system of a vehicle according to an exemplary embodiment of the present invention.

Figure 1:
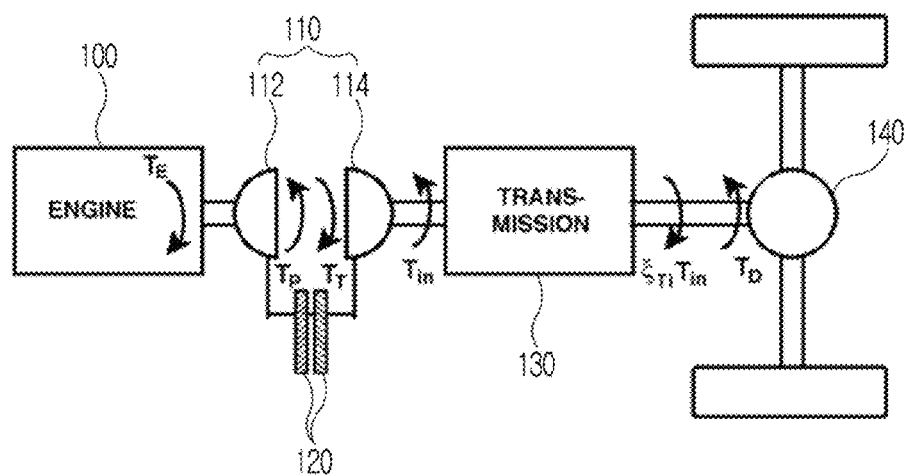
FIG. 1 is a schematic diagram of a power delivery system of a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

FIG. 1 is a schematic diagram of a power delivery system of a vehicle according to an exemplary embodiment of the present invention.

Referring to FIG. 1, a power delivery system of a vehicle includes an engine 100, a torque converter 110, a transmission 130, and a differential gear 140, wherein the torque converter 110 includes a pump 112, a turbine 114, and a damper clutch (120, rock up clutch).

The engine 100 transfers power to the differential gear 140 and wheel through the torque converter 110 and the transmission 130, and the torque converter 110 uses the pump 112 and the turbine 114 to transfer torque of the engine 100 to a transmission input shaft of the transmission 130.

Meanwhile, the pump 112 and the turbine 114 can increase torque amount and does not transfer all rotation speed, but the damper clutch 120 direct connect one side of the pump 112 with one side of the turbine 114 to transfer the speed intact without loss.

Further, the transmission 130 transforms the torque that is input through a transmission input shaft through gear step (gear speed) to output through a transmission output shaft.

Figure 2:
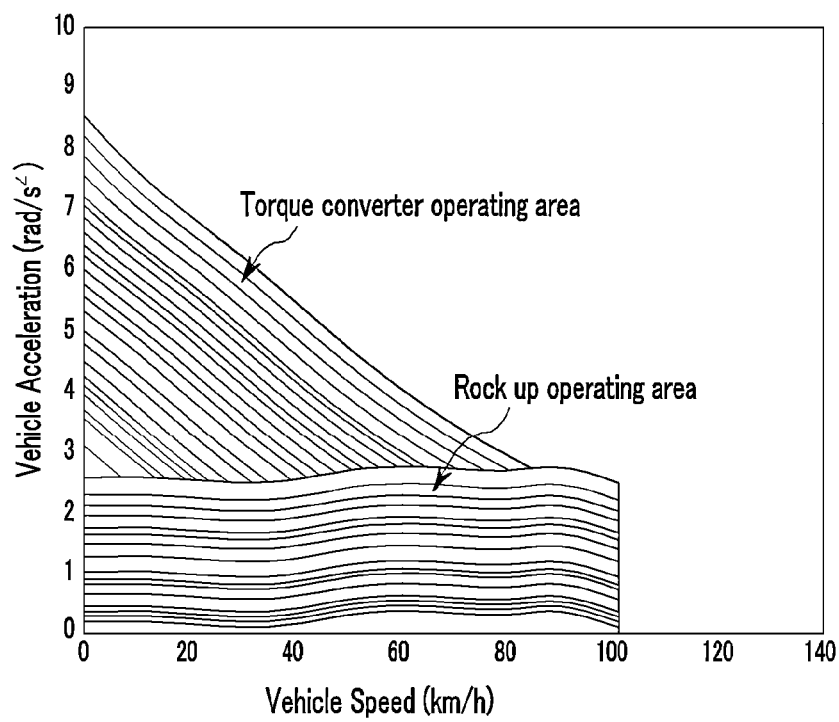
FIG. 2 is a graph showing an operating area of a damper clutch and a torque converter according to vehicle speed and acceleration in a power delivery system of a vehicle according to an exemplary embodiment of the present invention.

FIG. 2 is a graph showing an operating area of a damper clutch and a torque converter according to vehicle speed and acceleration in a power delivery system of a vehicle according to an exemplary embodiment of the present invention.

Referring to FIG. 2, a horizontal axis denotes vehicle speed and a vertical axis denotes vehicle acceleration. Here, the speed of the vehicle is detected by a speed of the transmission output and the vehicle acceleration can be detected by a speed of the transmission output shaft.

As shown, one area that that the damper clutch 120 is locked up and the other torque converter operating area that the damper clutch 120 is not locked up such that the torque is transferred through the pump 112 and the turbine 114.

Generally, when the acceleration is low, the lock up is performed, and when the acceleration is high, the lock up is not performed and the torque converter is operated.

Figure 3:
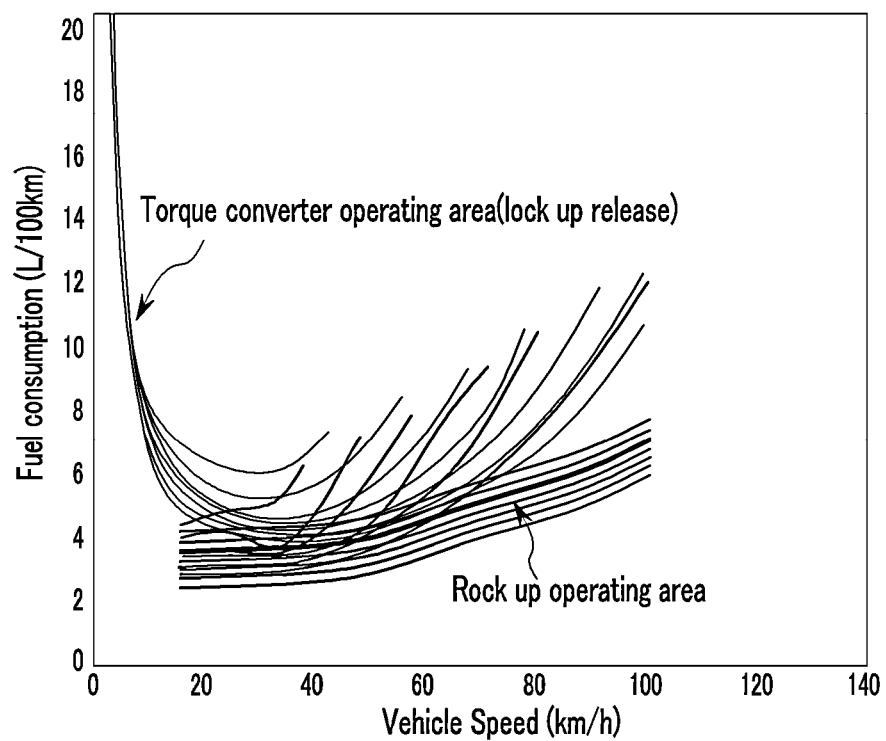
FIG. 3 is a graph showing operating area of damper clutch and torque converter according to vehicle speed and fuel consumption amount in a power delivery system of a vehicle according to an exemplary embodiment of the present invention.

FIG. 3 is a graph showing operating area of damper clutch and torque converter according to vehicle speed and fuel consumption amount in a power delivery system of a vehicle according to an exemplary embodiment of the present invention.

Referring to FIG. 3, a horizontal axis denotes a speed of a vehicle (transmission output shaft speed), and a vertical axis denotes a fuel consumption amount.

As shown, a lock up operating area that the damper clutch 120 is operated and a torque converter operating area that the damper clutch 120 is operated are varied according to the driving condition.

Generally, the lock up operating area reduces fuel consumption amount and the converter operating area increases fuel consumption amount and is formed in a condition that a vehicle speed is slow.

Figure 4A:
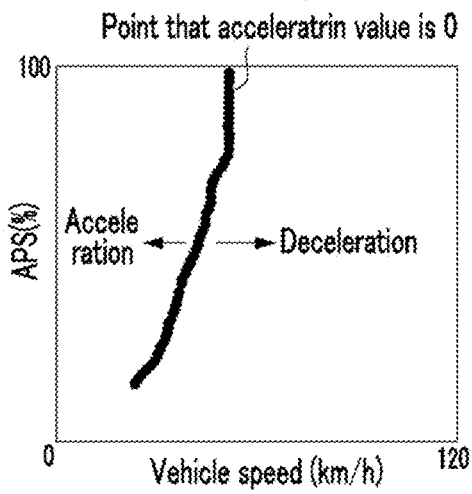
FIGS. 4A, 4B and 4C are graphs showing a method for setting up a slip area of a damper clutch in a power delivery system of a vehicle according to an exemplary embodiment of the present invention damper clutch.
Figure 4B:
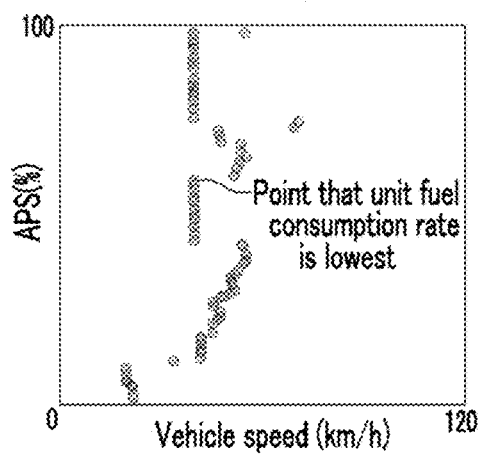
Figure 4C:
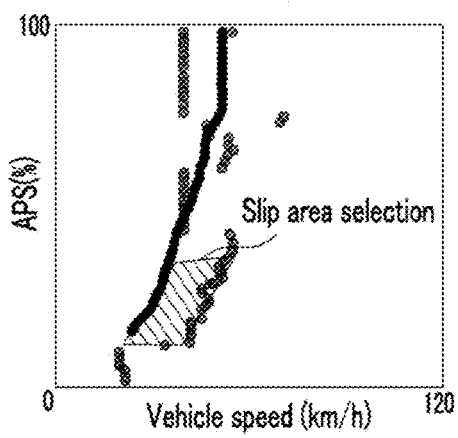

FIGS. 4A, 4B and 4C are graphs showing a method for setting up a slip area of a damper clutch in a power delivery system of a vehicle according to an exemplary embodiment of the present invention damper clutch.

Referring to FIG. 4A, a horizontal axis denotes a vehicle speed, and a vertical axis denotes accelerator pedal signal (APS: acceleration pedal signal).

Further, in FIG. 4A, right side shows a deceleration condition and left side shows a acceleration condition based on a line that acceleration value is 0.

Referring to FIG. 4B, a horizontal axis denotes a vehicle speed, a vertical axis denotes an accelerator pedal signal (pushing amount, which corresponds to throttle opening rate), and points that unit fuel consumption rate is lowest are distributed. Generally, the parts that the unit fuel consumption rate is low are in an area that the vehicle speed is 40 km/h.

Referring to FIG. 4C, FIGS. 4A and 4B are overlapped, wherein an area that the damper clutch 120 is slipped is formed between the part that the acceleration value is 0 and the part that the unit fuel consumption rate is lowest.

FIG. 5 is a graph showing a method for setting up theoretical target slip velocity by using engine output torque and damper clutch durability limit (life span) in a slip area in a power delivery system of a vehicle according to an exemplary embodiment of the present invention.

Referring to FIG. 4A, a horizontal axis is a transmission output shaft speed, and a vertical axis denotes a throttle valve opening rate. Here, the opening rate of the throttle valve is proportional to APS signal.

Figure 5A:
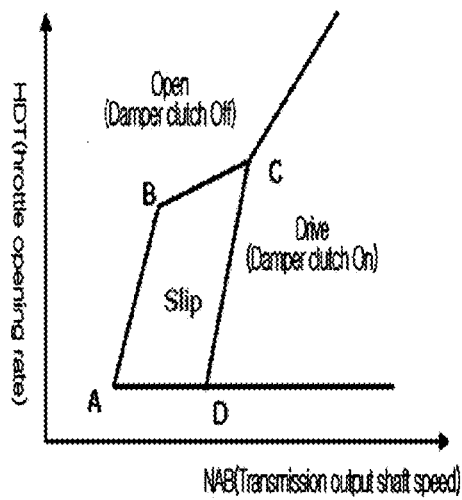
FIG. 5(a), FIG. 5(b), FIG. 5(c) and FIG. 5(d) are graphs showing a method for setting up theoretical target slip velocity by using engine output torque and damper clutch durability limit (life span) in a slip area in a power delivery system of a vehicle according to an exemplary embodiment of the present invention.

As shown in the FIG. 5A, the damper clutch operating area, the damper clutch release area, and the damper clutch slip area are divided according to the opening rate of the throttle valve and the transmission output shaft speed. The slip area is defined to be formed inside the limit point of A, B, C, and D for convenience.

Figure 5B:
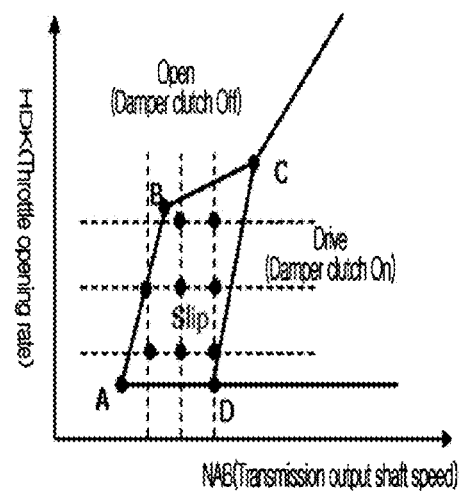

As shown in the FIG. 5B, points are defined in the slip area with a predetermined distance, wherein the points are distributed along matrix shape.

Figure 5C:
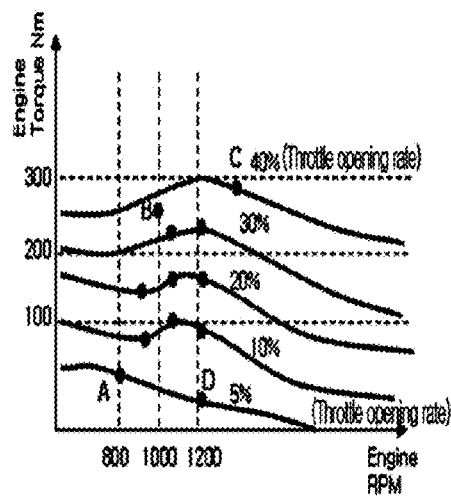

As shown in the FIG. 5C, a horizontal axis denotes a rotation speed of the engine 100, a vertical axis denotes a torque of the engine 100, and engine torque for the limit point of A, B, C, and D of FIGS. 5A and 5B are detected according to the throttle opening rate (10%, 20%, 30%, 40% . . . ).

Figure 5D:
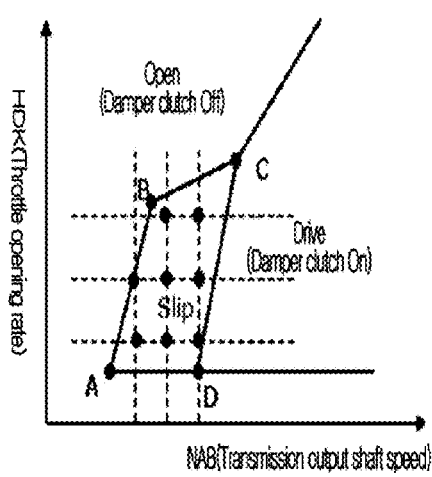

As shown in the FIG. 5D, a horizontal axis denotes a slip speed (amount), a vertical axis denotes an engine output torque (input torque), and a predetermined slip velocity are calculated/selected according to the durability limit line of the damper clutch (120, lock up clutch) of each limit point A, B, C, and D that is derived in the FIG. 5C according to the engine torque.

Figure 6:
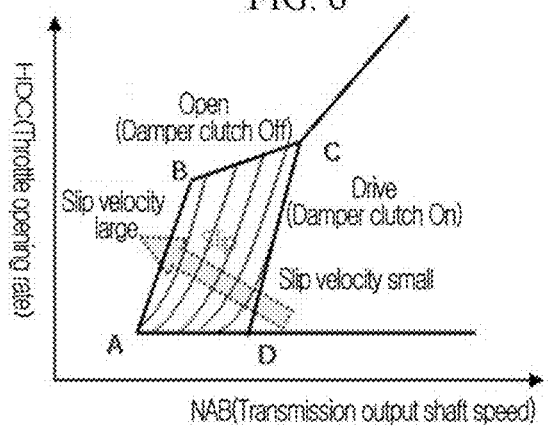
FIG. 6(a), FIG. 6(b), and FIG. 6(c) are graphs showing a method for setting up theoretical target slip velocity by using a constant speed ratio diagram of a torque converter and crossing point of slip area matrix point in a power delivery system of a vehicle according to an exemplary embodiment of the present invention.
Figure 6:
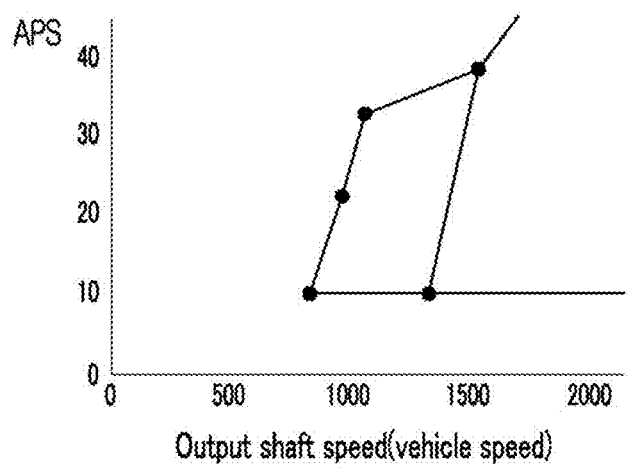
Figure 6:
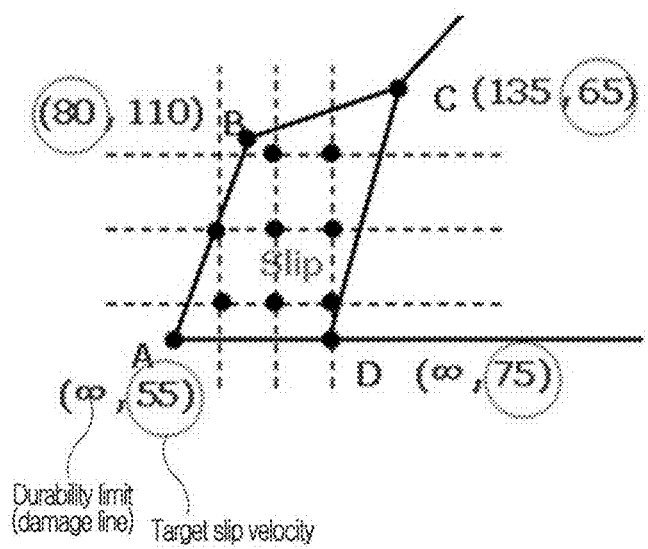

FIG. 6 is a graph showing a method for setting up theoretical target slip velocity by using a constant speed ratio diagram of a torque converter and crossing point of slip area matrix point in a power delivery system of a vehicle according to an exemplary embodiment of the present invention.

Referring to an upper graph of FIG. 6, a horizontal axis is an output shaft speed of a transmission and a vertical axis is opening rate of a throttle valve, which schematically shows large value and small value distribution of slip velocity and each boundary point A, B, C, and D in a slip area of the damper clutch.

Referring to a middle graph of FIG. 6, this is a graph that real torque converter constant speed ratio distribution and matrix point distribution in the slip control area that is already defined are overlapped.

Here, the constant speed ratio diagram is relevant to FIG. 4A, which is a graph that points that acceleration is 0, that is, constant speed points are distributed.

Referring to a lower graph of FIG. 6, a limit slip velocity that is defined by a durability limit of the damper clutch 120 and the slip velocity that is get by the constant speed ratio diagram are compared in the boundary points A, B, C, and D to select a minimum slip velocity. As shown, the theoretical target slip velocity in the boundary points A, B, C, and D are selected as 55, 80, 65, and 75.

FIG. 7 shows formula showing contents for load ratio and slip velocity in a power delivery system of a vehicle according to an exemplary embodiment of the present invention.

Referring to FIG. 7, a load ratio (load_gain) is calculated by an output torque (Tq) of the engine 100, an output torque (Tq_idle) in an idle condition of the engine 100, an output speed Ne of the engine, an idle output speed (Ne_idle) of the engine, and a variable coefficient (Load gain), wherein the variable coefficient is varied according to a shift step of the transmission.

The slip velocity (slip amount) is calculated by a rotation speed Ne of the engine and a speed Nt of the transmission input shaft.

In an exemplary embodiment of the present invention, it is desirable that signal of a throttle position sensor (TPS) is input instead of engine torque in a MPI engine and the engine torque is input in a diesel/turbo engine.

Figure 8:
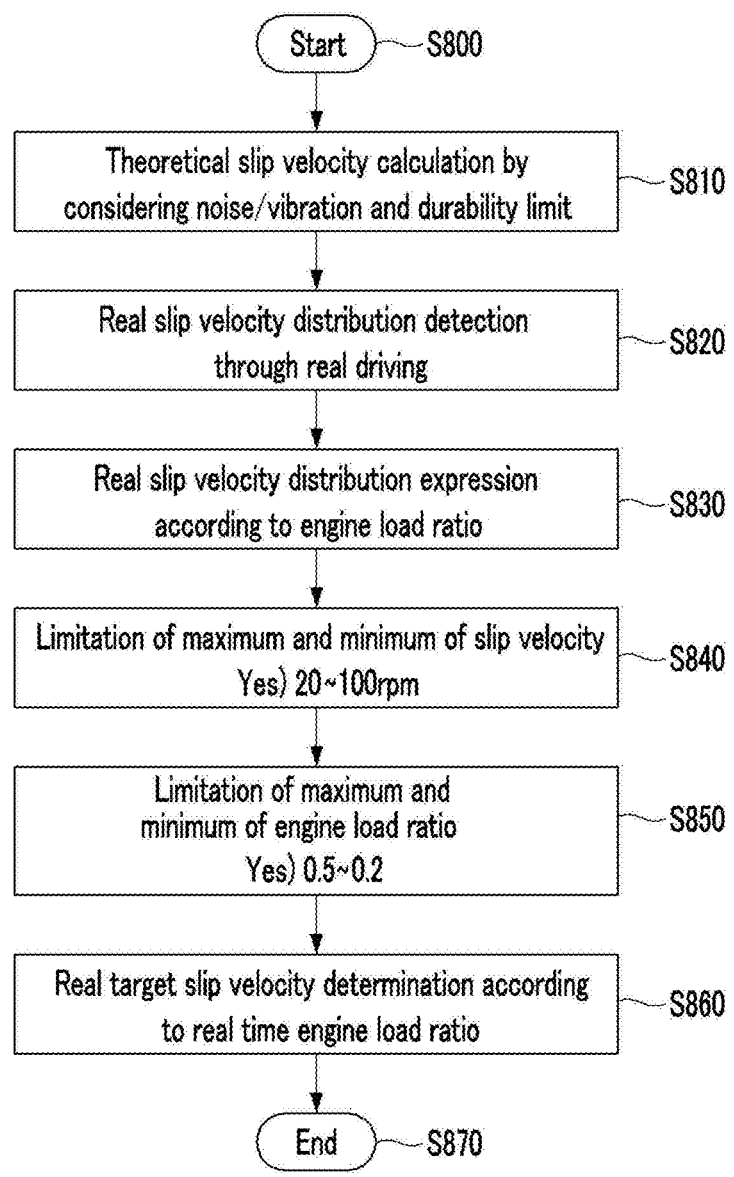
FIG. 8 is flowchart for controlling a power delivery system of a vehicle according to an exemplary embodiment of the present invention.

FIG. 8 is flowchart for controlling a power delivery system of a vehicle according to an exemplary embodiment of the present invention.

Referring to FIG. 8, a control is performed in a S800, and a theoretical target slip velocity of the torque converter is calculated by considering slip area limit and durability limit so as to reduce noise/vibration caused by direct connection booming according to an exemplary embodiment of the present invention in a S810.

The theoretical target slip velocity can be calculated by using crossing point of the durability limit and the constant speed ratio of the torque converter in FIGS. 1 to 6 that has been described.

The theoretical target slip velocity that is calculated by experimental data in a steady state is used to detect the distribution of the real slip velocity in a real driving condition in a S820.

In a S830, the real slip velocity is expressed in a function to be distributed according to load ratio of the engine.

In a S840, the real slip velocity is limited from 20 to 100 rpm, and the engine load ratio is limited from 0.5 to 0.2 as a minimum value and a maximum value.

The real slip velocity and the engine load ratio are varied by considering design specification of the damper clutch 120 or stability of a power delivery device.

A real time engine load ratio is calculated and a target slip velocity is calculated/selected according to the calculated engine load ratio in a 860, and the control ends in a S870.

As described above, the theoretical target slip velocity is calculated in a steady state, the distribution value of the real slip velocity theoretical according to the target slip velocity is expressed in a function according to the engine load ratio.

Further, the engine load ratio that is detected in a real time is applied to the function to calculate a target slip velocity and the target slip velocity is applied to the damper clutch to make the slip velocity of the damper clutch variably to be controlled in a real time such that the fuel consumption can be reduced and the engine torque can be smoothly transferred to the transmission.

Figure 9:
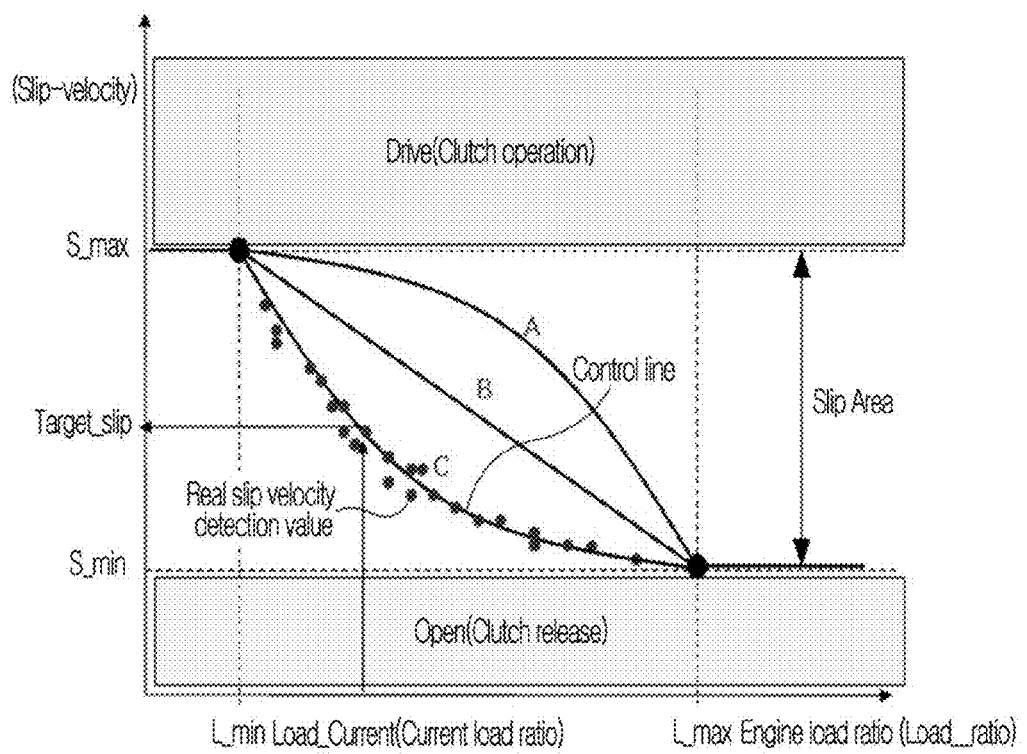
FIG. 9 is a graph showing load ratio and slip velocity of engine in a power delivery system of a vehicle according to an exemplary embodiment of the present invention.

FIG. 9 is a graph showing load ratio and slip velocity of engine in a power delivery system of a vehicle according to an exemplary embodiment of the present invention.

Referring to FIG. 9, a horizontal axis denotes an engine load ratio, a vertical axis denotes a slip velocity of the damper clutch 120, and a control line diagram is defined by a function between a minimum value (S min) of a slip and a maximum value (S_max). The control line diagram can be expressed in a real target slip velocity.

The damper clutch 120 is controlled depending on the theoretical target slip velocity that is calculated in FIGS. 1 to 6, the detected values are distributed, and the distributed values are expressed in a function, which is the control line diagram.

The real target slip velocity is calculated according to the real time engine load ratio based on the control line diagram on an exemplary embodiment of the present invention, and this is applied to control the damper clutch 120.

Figure 10:
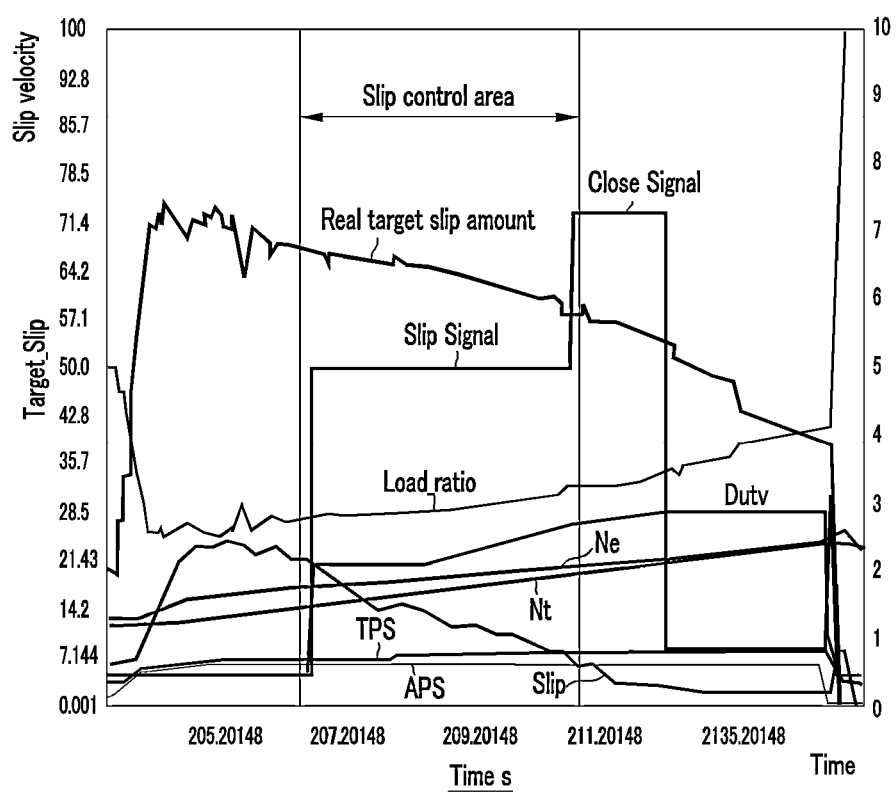
FIG. 10 is a graph showing control result of a power delivery system of a vehicle according to an exemplary embodiment of the present invention.

FIG. 10 is a graph showing control result of a power delivery system of a vehicle according to an exemplary embodiment of the present invention.

Referring to FIG. 10, a horizontal axis denotes time, and a vertical axis denotes APS signal, TPS signal, Nt, Ne, Loat_ratio, slip signal, a real target slip velocity (target slip velocity), and a slip control area.

It can be known that the real target slip velocity is variably applied in the slip control area. As shown, it can be known that the target slip velocity is varied according to the engine load ratio in an early stage of the slip area.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A control method of a power delivery system of a vehicle, comprising:
    determining a theoretical target slip velocity of a torque converter;
    detecting a real slip velocity of a damper clutch in a real driving condition and based on the theoretical target slip velocity;
    expressing, by a control line diagram, distributions of the real slip velocity according to an engine load ratio;
    controlling a real target slip velocity of the damper clutch according to the control line diagram by using the engine load ratio;
    selecting a slip area for slipping the damper clutch, the slip area being defined as an area positioned between a line that a unit fuel consumption amount is lowest and a line that an acceleration value is 0, wherein the slip area is set according to an output shaft speed of a transmission and an accelerator pedal sensor;
    setting up the slip area, a lock up release area, and a lock up area according to an opening rate of a throttle valve (TPS) and the output shaft speed of the transmission;
    selecting a boundary of the slip area and matrix points of the slip area;
    determining an output torque of an engine in the boundary and in boundary points and setting up a durability limit slip velocity in the boundary and the boundary points by using a durability limit of the damper clutch; and
    setting up a permission slip velocity in the boundary and in the boundary points in a slip control entry area through a speed ratio between an input shaft speed of the transmission and an output shaft speed of the engine, wherein a minimum value among the durability limit slip velocity and the permission slip velocity is set to the theoretical target slip velocity.

2. The control method of the power delivery system of claim 1, wherein:
    a range of the real slip velocity is limited within a predetermined range; and
    a range of the engine load ratio is limited within a predetermined range.

3. The control method of the power delivery system of claim 2, wherein the real slip velocity ranges from 20 to 100 rpm.

4. The control method of the power delivery system of claim 2, wherein the engine load ratio ranges from 0.5 to 2.

5. The control method of the power delivery system of claim 2,
    wherein the engine load ratio is determined by $(Ne-Ne\_idle)/(Tq-Tq\_idle)*load\ gain\ value$,
    wherein Ne is an engine rotation speed, Ne_idle is an idle speed of engine, Tq is an engine output torque, Tq_idle is an engine output torque in an idle condition, the load gain value is a variable coefficient that is set according to a gear step of the transmission.

6. The control method of the power delivery system of claim 2,
    wherein a slip velocity of the damper clutch is determined by $Ne-Nt$,
    wherein Ne is an engine rotation speed, and Nt is the transmission input shaft speed.

* * * * *